United States Patent [19]

Mirel

[11] Patent Number: 4,643,213
[45] Date of Patent: Feb. 17, 1987

[54] METHOD AND APPARATUS FOR CONTROLLING LEAKS IN PRESSURIZED FLUID SYSTEMS

[75] Inventor: Arthur G. Mirel, Scarsdale, N.Y.
[73] Assignee: Techrad Corporation, Scarsdale, N.Y.
[21] Appl. No.: 637,615
[22] Filed: Aug. 3, 1984
[51] Int. Cl.⁴ .................. F16K 31/40; G01M 3/26; G01F 1/24
[52] U.S. Cl. .................. 137/10; 73/861.58; 137/110; 137/355.18; 137/486; 137/487.5; 137/491; 137/613; 137/614.19
[58] Field of Search ............ 137/110, 486, 487.5, 137/491, 614.19, 355.18, 613, 98, 3, 114, 10; 73/861.58, 40.5 R

[56] References Cited

U.S. PATENT DOCUMENTS

| | | | |
|---|---|---|---|
| 1,729,306 | 9/1929 | Woodford | 137/355.18 |
| 1,958,644 | 5/1934 | Smith | 137/487.5 |
| 3,213,875 | 10/1965 | Spence | 137/110 |
| 3,225,785 | 12/1965 | Goike | 137/487.5 X |
| 3,454,195 | 7/1969 | Deters | 73/40.5 R X |
| 3,521,481 | 7/1970 | Tyrone | 48/193 X |
| 3,922,111 | 11/1975 | Deters | 137/491 X |
| 3,969,923 | 7/1976 | Howell | 73/40.5 R |
| 4,043,355 | 8/1977 | Cerruti | 73/40.5 R X |
| 4,059,984 | 11/1977 | Uhlarik | 73/40.5 R |
| 4,349,711 | 9/1982 | Lake | 73/861.58 X |
| 4,431,020 | 2/1984 | Kowalski | 137/486 X |
| 4,487,077 | 12/1984 | Lake | 73/861.58 |

Primary Examiner—Martin P. Schwadron
Assistant Examiner—Stephen M. Hepperle
Attorney, Agent, or Firm—Steinberg & Raskin

[57] ABSTRACT

Method and apparatus for controlling fluid leakage from sections of a pressurized fluid system adapted to provide fluid at line pressure to equipment associated therewith includes means for sensing first and second conditions indicative of non-use and of a usage demand respectively of the equipment and for generating a signal indicative of one of the conditions and control unit means for selectively isolating and effecting communication between line pressure of the fluid system and the system section in response to the condition-indicating signal. According to a first embodiment, the first non-use and second usage demand conditions are constituted by respective lower and higher rates of fluid flow through the section of the fluid system in which leakage is to be controlled. According to a second embodiment of the invention, the first non-use and second usage demand conditions are constituted by support and non-support of the equipment respectively or non-movement and movement of the equipment respectively.

21 Claims, 24 Drawing Figures

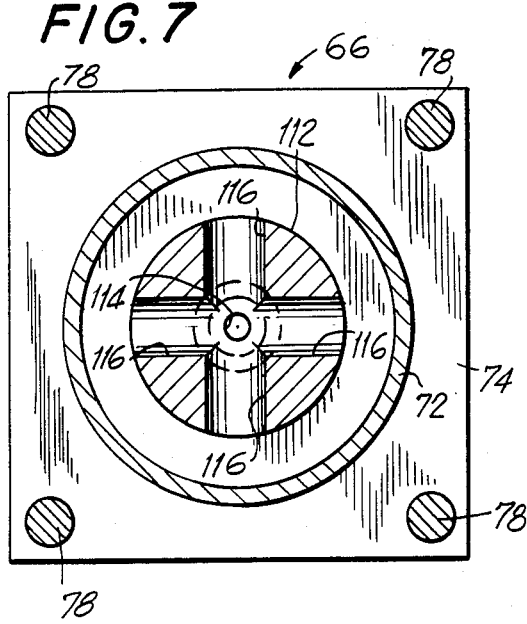
FIG. 7
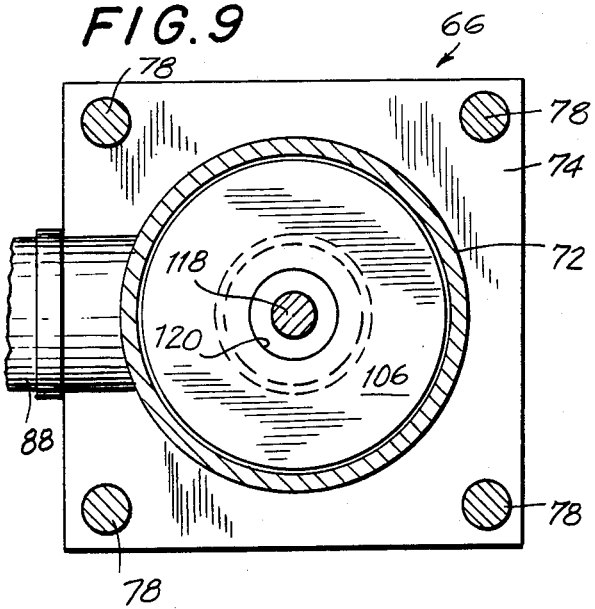
FIG. 9
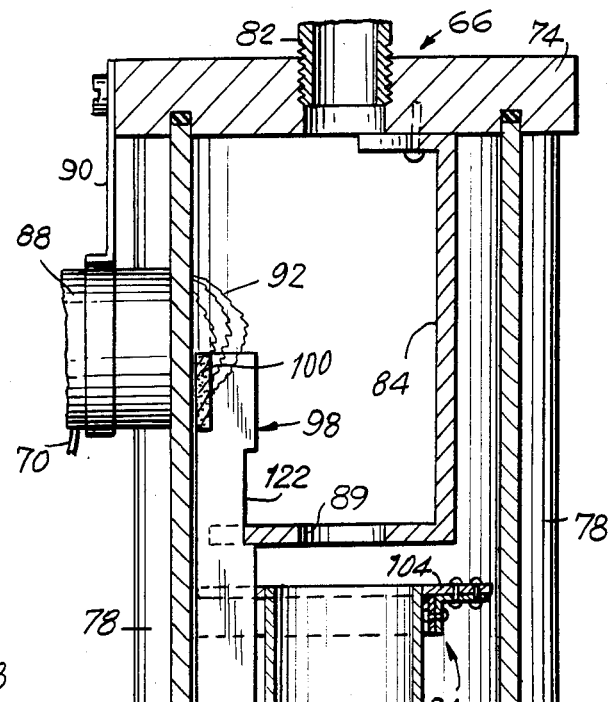
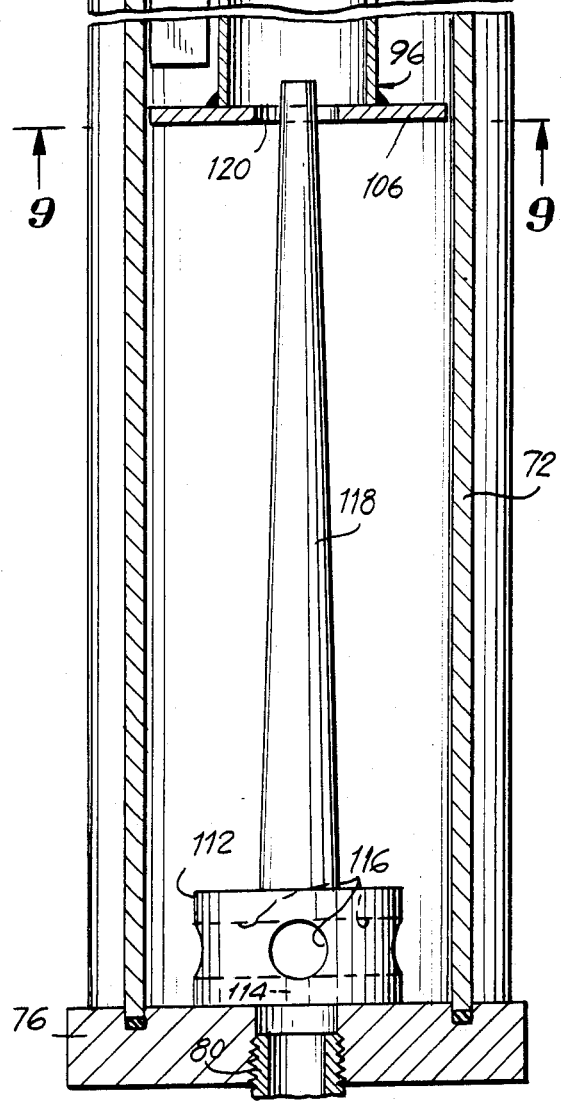
FIG. 8

FIG.13
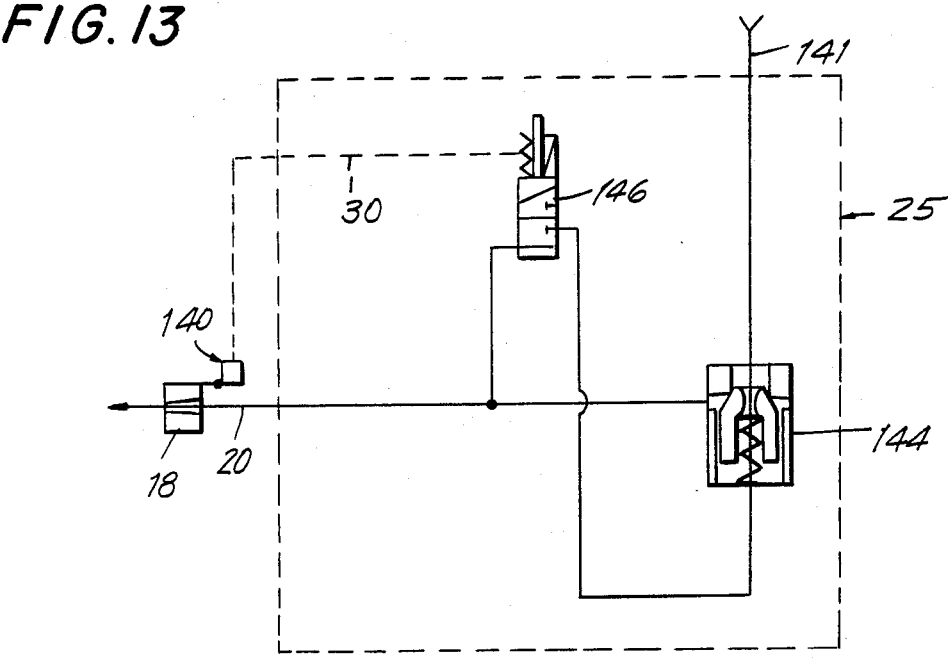
FIG.12
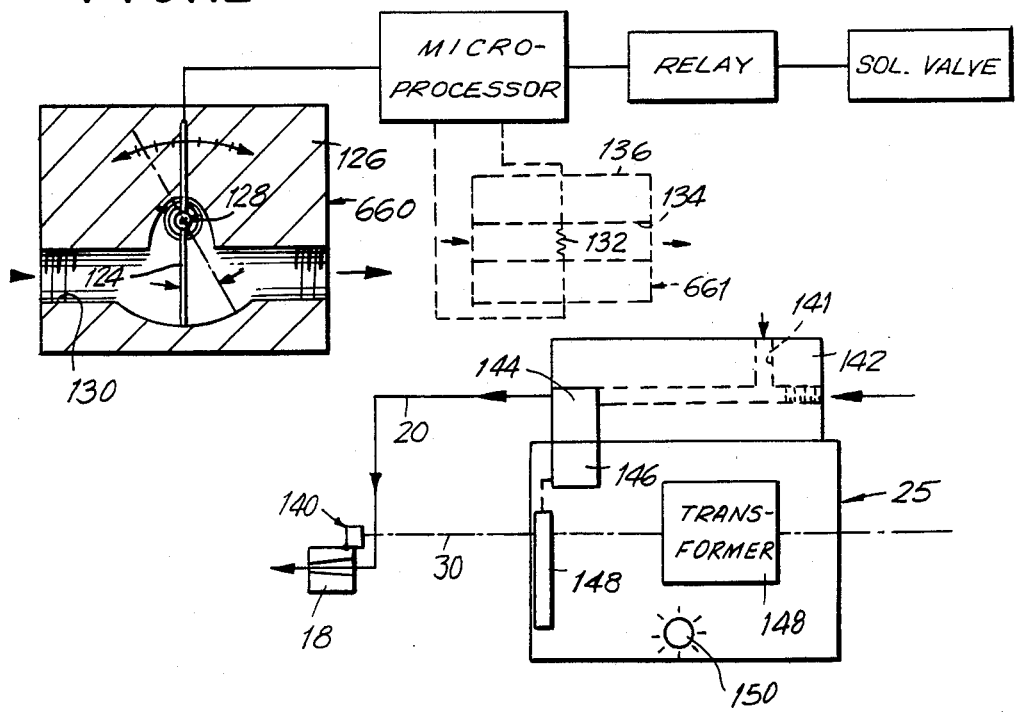
FIG.14

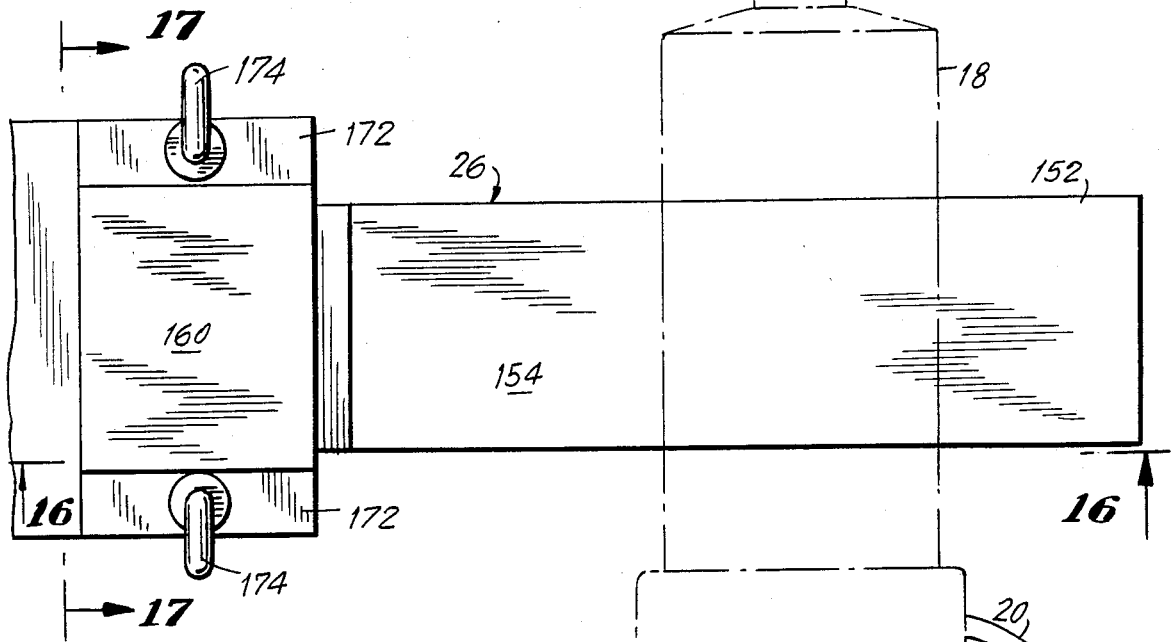
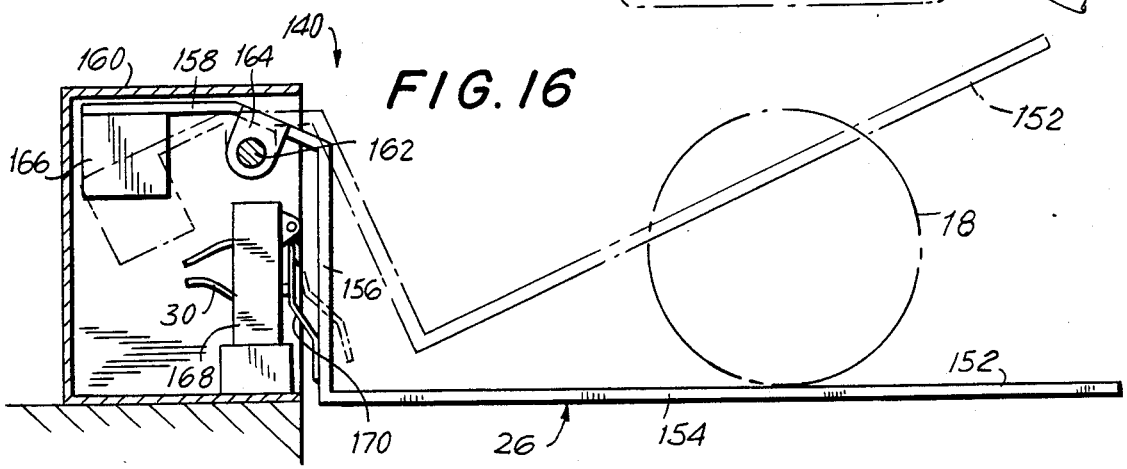
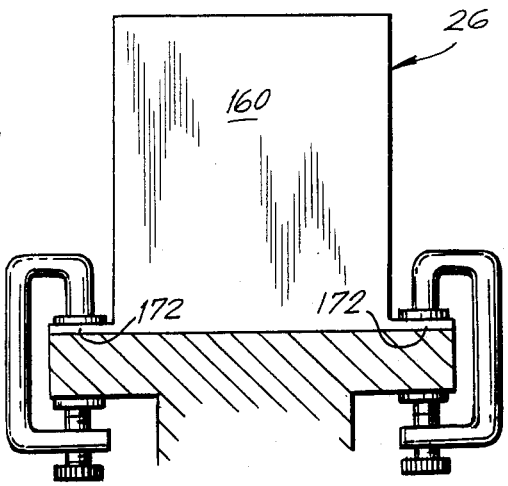

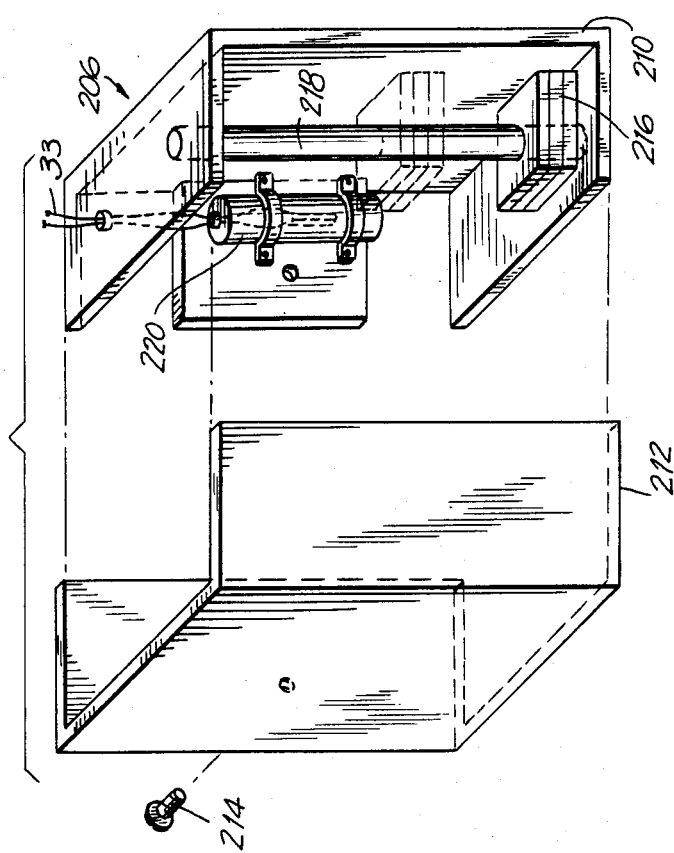
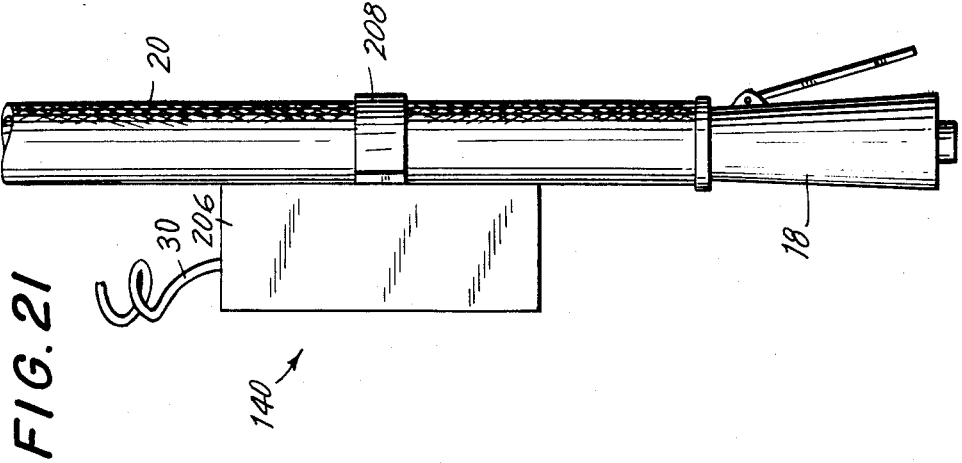

METHOD AND APPARATUS FOR CONTROLLING LEAKS IN PRESSURIZED FLUID SYSTEMS

BACKGROUND OF THE INVENTION

This invention relates generally to methods and apparatus for energy conservation in pressurized fluid systems and, more particularly, to methods and apparatus for controlling leaks in pressurized fluid systems such, for example, as pneumatic systems, to thereby conserve energy in such systems.

Although the invention will be described as applied to a pneumatic or compressed air system, those skilled in the art will readily understand that the invention is equally applicable to other types of pressurized fluid systems, e.g., hydraulic systems which provide motive force for any type of fluid-driven equipment and systems for industrial, process and medical applications which utilize compressed gases such as argon, helium, nitrogen and the like.

Compressed air provides the motive power for tools and machinery in a great number of industrial and other applications. For example, compressed air is used to power various types of tools such, for example, as grinders, screwdrivers, impact wrenches, nut runners, hoists and saws, among others.

In a typical factory equipped with compressed air systems, air-driven tools at work stations throughout the plant are fluidly connected to a network of pipes by long, flexible hoses or drops. Thus, in certain instances a plurality of air tools at a corresponding plurality of work stations are interfaced with the pipe system through multiple drops. The system generally must present the air tool in a manner so as to allow the operator a relatively wide range of flexibility or freedom of movement in his work and, moreover, provide the compressed air in a manner such that it is suitable for use in air tool motors and equipment.

A significant problem exists in conventional compressed air systems, namely, the leakage of compressed air from various leakage points present in the air drops. Although at first blush the problem may not appear significant, it will be seen from the following that in fact the costs resulting from air leakage are surprisingly high.

A typical air drop for an air tool in a conventional compressed air system generally employs a flexible hose, various couplings, quick disconnects and filter-regulator-lubricator (FRL) units. Points of potential air leakage associated with air drops in common compressed air systems include the connections of the air drop to the main header or overhead pipe network, various hose connections including the quick disconnects, hose deterioration, tool control valves, the filter-regulator-lubricator units, machine connections and the machine air components themselves, such as valves, piston, nozzles, etc. Indeed, a single typical air drop may have a total of six to ten potential leakage points.

Moreover, even though air demands of any single tool are generally intermittent, i.e., the tool at the end of each air drop is usually operated on an intermittent basis, conventional systems are typically constructed so that each air drop is at all times at the full or line pressure which exists in the pipe network. It is not uncommon in some facilities for each air drop to "seek" line pressure for times on the order of about 6000 hours per year. When it is considered that the tool is used approximately 20% of the time, it is seen that the air drops are subject to leakage loss about 80% of the time that the compressor is in operation.

Although the area of a single leakage point in an air drop may be relatively minute, e.g., 0.0005 in$^2$, six such leakage points in a single air drop have a cumulative effective leakage area of 0.0030 in$^2$ which is equivalent to a leakage opening having a diameter of 1/16 inch. This corresponds to a leakage rate of about 6.49 cfm at 100 psig line pressure. With the cost of generating compressed air presently being on the order of 28 cents per 1000 cubic feet, the losses incurred at a single air drop having leakage points as described above amounts to about $607.00 per year. It has been estimated that there are about 7,000,000 air drops presently in existence through which air tools and equipment are connected to air supplies. When viewed in this light, it is seen that the costs of air leakage are in fact quite significant.

Presently, air leak control is a rather haphazard operation involving detection essentially through observation or through maintenance procedures. Currently available products are generally limited to instruments that can only identify leakage points for manual repair and the costs of maintenance crews for spotting and correcting leaks is enormous. Indeed, many leaks are never found due to the difficulty of detecting a tasteless, odorless and colorless gas which leaks with a noise which is generally inaudible over plant background noise.

In order to compensate for air leakage, compressors are often oversized by 15 to 20% with consequent increased energy costs thereby further increasing the high cost of leakage maintenance.

SUMMARY OF THE INVENTION

Accordingly, it is an object of the present invention to provide new and improved methods and apparatus for controlling leaks in pressurized fluid systems, such as compressed air systems.

Another object of the present invention is to provide new and improved apparatus for controlling leaks in pressurized fluid systems having a relatively simple construction and economical cost in manufacture.

Still another object of the present invention is to provide new and improved methods and apparatus for controlling leaks in pressurized fluid systems which do not require the modification of existing tools or equipment.

A further object of the present invention is to provide new and improved methods and apparatus for controlling leaks in pressurized fluid systems which do not require additional operation procedures.

A still further object of the present invention is to provide new and improved apparatus for controlling leaks in pressurized fluid systems which are easy to install in existing systems regardless of field conditions.

Briefly, in accordance with the present invention these and other objects are attained by providing methods and apparatus wherein the air drop is automatically and selectively isolated from and brought into communication with the main pressurized fluid system solely in response to a signal indicative of tool or equipment usage demand. In the case of a compressed air system, the potential leakage points present in an air drop are removed from the system when the tool is not in use. As a result, the volumetric flow rate developed by the compressor is channeled only to operating working stations and compressed air cannot escape to the atmosphere during the non-demand periods which as noted above average about 80% of the time of compressor operation.

The invention provides several important advantages. Power costs are reduced through the elimination of continuous leakage losses and by enabling the compressor to operate at lower pressures. The work stations furthest from the compressor will not be starved for compressed air due to leakage from points more proximate to the compressor. Maintenance costs are reduced by reducing compressor load since the compression equipment must only satisfy actual or "demand-only" conditions and need not accommodate the load imposed by leakage. Moreover, plant engineering personnel can be relieved from relatively expensive leak detection and correction procedures.

In accordance with the invention, one or more control units are arranged in the fluid system upstream of the respective fluid-driven tools or equipment, each control unit being adapted to normally isolate the portion of the fluid line and tool and/or equipment downstream of the control unit (and the potential leakage points present therein) from the system line pressure in the absence of a tool usage demand situation. Upon a tool usage demand situation occurring, a signal is automatically generated and sensed by the appropriate control unit which then functions to bring the previously isolated fluid line portion into communication with the system line pressure to drive the tool or equipment.

In the case of a compressed air system for air-driven tools, a control unit is arranged in the system between the overhead pipe network and the root of an air drop which is desired to be isolated from the line pressure when the tool at the end of the air drop is not in use. The potential points of leakage in the air drop are thereby removed from the system when the tool is not in use.

Two basic embodiments of the invention are disclosed. In a first embodiment, separate signaling devices, i.e., signaling devices external of the control unit itself, are not required rendering the embodiment particularly useful where the work station requires complete freedom of movement of the operator and which therefore precludes the use of fixed signalling devices. In this embodiment the control unit provides a minimal pilot pressure in the air drop when the tool is not in use and the signaling means which are incorporated in the control unit itself in the form of flow rate detection means are adapted to discriminate between varying air flow rates which characterize line leakage from the air drop at the pilot pressure in a non-demand situation and the air flow rate in the drop at pilot pressure in a work demand situation. When the tool is not in use, the control unit senses only the varying leakage flow rate (at pilot pressure) and maintains the air drop isolated from line pressure. However, when the tool is actuated by the operator, a work demand flow rate (at pilot pressure) is sensed and the control unit functions to communicate the air drop with line pressure. This embodiment of the invention is particularly useful for work stations where the tools are connected to the pipe network by long air lines, such as in large weldment grinding areas, manifold air connections, etc. The ability to discriminate between varying leakage and work demand flow rates at a minimal pilot pressure is maintained regardless of the length of the air supply hose rendering this embodiment especially useful in heavy fabrication facilities, such as shipyards and the like.

The invention also provides the capability of discrimination between varying leak rates and work demand flow rates at all operating pressures ranging from pilot to full line pressure as maintained in the portion of the system downstream from the control unit.

According to a second embodiment of the invention, the control units are adapted to interface with external signaling devices. The signaling devices may take any convenient form, such as tool hangers or rests, foot treadles, motion sensing switches and the like. A work demand situation activates the signaling device which generates a signal which is sensed by the control unit. For example, in the case where the signaling device comprises a tool holder, i.e., a device which provides a holder for the tool when it is not in use, a work demand situation is created when the tool is lifted from the tool hanger whereupon a signal is generated and sensed by the control unit which then communicates the air drop with line pressure. This embodiment of the invention is particularly useful at fixed work stations, such as assembly benches, machine tools, paint spray booths and the like.

DESCRIPTION OF THE DRAWINGS

A more complete appreciation of the present invention and many of the attendant advantages thereof will be readily understood by reference to the following detailed description when considered in connection with the accompanying drawings in which:

FIG. 7 is a section view taken along line 7—7 of FIG. 4;

FIG. 8 is a view similar to FIG. 4 illustrating the flow rate detector switch as it senses a work-demand condition;

FIG. 9 is a section view taken along line 9—9 of FIG. 8;

FIG. 12 is a schematic illustration of a modification of the first embodiment of the invention;

FIG. 13 is a schematic flow circuit diagram of a control unit in accordance with a second embodiment of the invention incorporating external work-demand condition sensing means;

FIG. 14 is a schematic illustration of the second embodiment of the invention illustrated in FIG. 13;

FIG. 15 is a top plan view of the first modification of the second embodiment of the invention incorporating a tool rest as the external sensing means;

FIG. 16 is a section view taken along line 16—16 of FIG. 15;

FIG. 17 is a section view taken along line 17—17 of FIG. 15;

FIG. 21 is a side elevation view of a third modification of the second embodiment of the invention wherein the sensing means are in the form of a motion sensor switch;

FIG. 22 is an exploded perspective view of the motion sensor switch illustrated in FIG. 21;

DETAILED DESCRIPTION OF THE PREFERRED EMBODIMENTS

Figure 1:
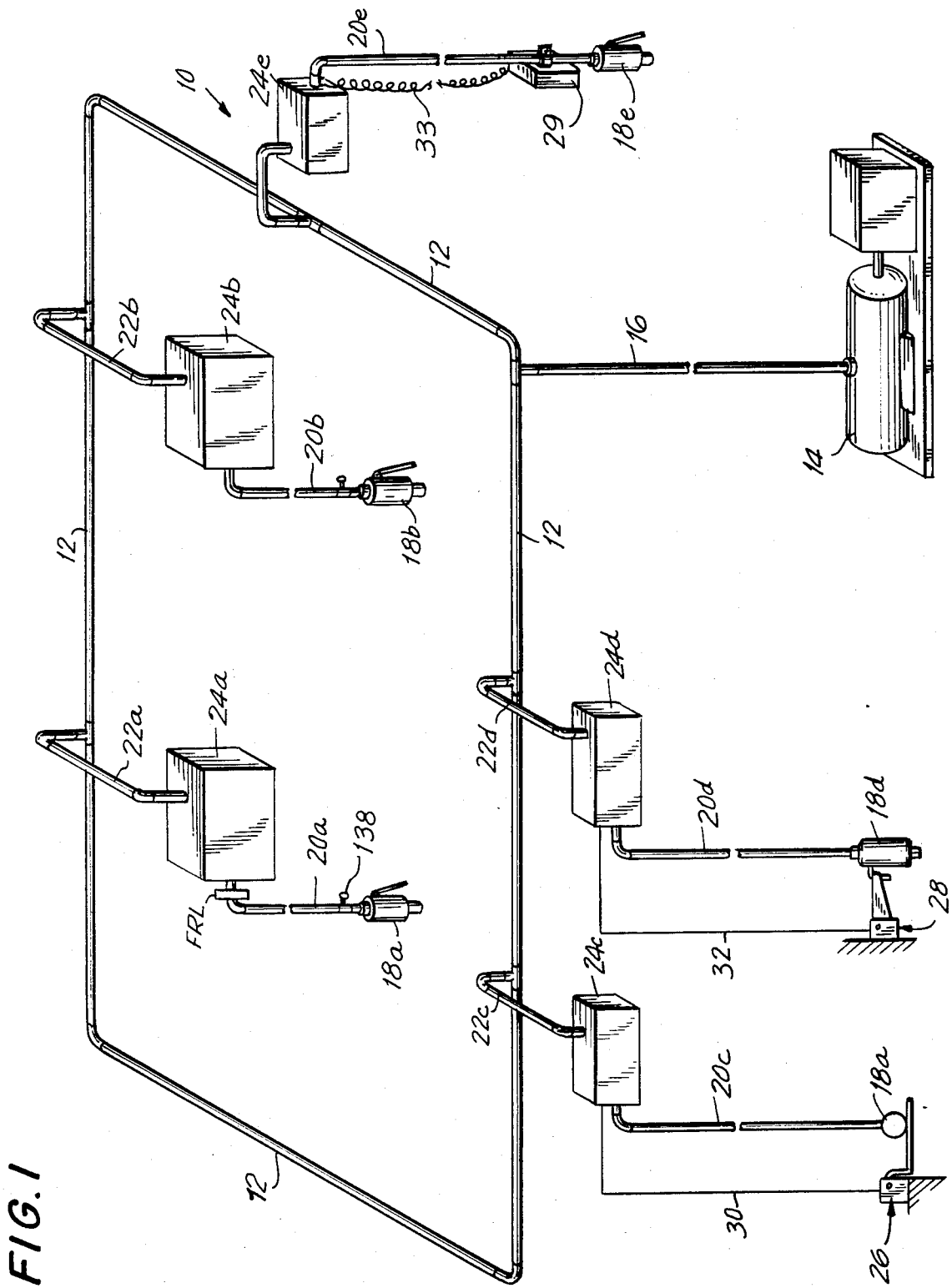
FIG. 1 is a schematic illustration of a compressed air system in accordance with the present invention and illustrating the two basic embodiments of the invention and modifications thereof.

Referring now to the drawings wherein like reference characters designate identical or corresponding parts throughout the several views and more particularly to FIG. 1, a compressed air system, generally designated 10, comprises a network of pipe sections 12 connected to a compressor unit 14 by a pipe 16. The pipe sections 12 are shown in the form of a loop and are generally situated in the overhead structure of a factory or the like. Five air-driven tools 18a–18e are coupled to the pipes 12 through respective air drops 20a–20e and corresponding inverted U-shaped pipe sections 22a–22e which function to capture moisture present in the system before entering the air drop. Each drop 20 comprises a length of flexible hose connected to air operated tools and/or other equipment and in many instances various couplers, filter-regulator-lubricator units, and quick disconnect fittings for connecting and disconnecting the tools 18 while the hose is at line pressure. The tools and equipment 18 may be of any conventional type, such as spray guns, cylinders, chip blowers, grinders, impact wrenches, drills, screwdrivers, percussion and compression tools, and the like. Many of these tools are equipped with an air motor having a normally closed valve which is opened when the tool is operated. The connectors, couplers, valves and the like present in each air drop as well as the valves of the tools themselves constitute potential leakage points in each air drop and it is the purpose of the present invention to control the leakage from these points by reducing such leakage to a minimal amount when the tools are not in use.

Air drops 20a and 20b are connected to the network of pipe sections 12 through respective control units 24a and 24b in accordance with a first embodiment of the present invention. In particular, the control units 24a and 24b incorporate internal means for sensing a work-demand condition of respective tools 18a and 18b in a manner such that each air drop is fluidly isolated from the system line pressure in the absence of a tool usage demand situation. Upon a tool usage demand situation occurring, a signal is automatically generated and sensed by the appropriate control unit which functions to bring the previously isolated drop into communication with the system line pressure to drive the tool. In this manner the potential points of air leakage present in each air drop is isolated from the line pressure when the tool is not in use.

Air drops 20c, 20d and 20e are connected to the system through respective control units 24c, 24d and 24e according to a second embodiment of the invention. Thus, control units 24c, 24d and 24e differ from control units 24a and 24b in that these control units are adapted to interface with external signaling devices in the form of a tool rest 26, a tool hanger 28 and a motion sensing switch 29. When the tools 18c, 18d and 18e are not in use they are associated with the respective signaling devices in a manner shown in FIG. 1 while the control units 24c, 24d and 24e maintain the respective air drops 20c, 20d and 20e isolated from line pressure. Upon lifting the tools from the respective tool rests 26 or tool hanger 28, or upon the tool 18e being moved preparatory to use, an electrical signal is generated which is transmitted through conductors 30, 32 and 33 to the respective control units which then act to bring each respective air drop into communication with the line pressure in pipes 12.

A first embodiment of the invention is illustrated in FIGS. 1-12. Acccording to this embodiment the control unit isolates the tool drop from line pressure and automatically establishes communication between the tool drop and line pressure when a tool usage demand condition is sensed by an internal sensing apparatus incorporated within the control unit itself.

Briefly, an internal signal-type control unit according to a first embodiment of the invention includes a main valve which isolates the tool drop from the line pressure and pressure regulating means which function to reduce the incoming line pressure which, for example, may be about 100 psig to a much smaller pilot pressure in the range, for example, of between about 4–6 psig. When the tool is not in use, the air in the tool drop is maintained at the reduced pilot pressure. Since various leakage points are usually present in the drop, a varying pilot air flow due to leakage exists in the drop when the tool is not in use, the varying so-called "leak flow rates" of which are quite small due to the relatively small value of the pilot pressure, these leak flow rates being characteristic of the condition of non-use of the tool. When a tool usage demand condition occurs, e.g., when the tool operator actuates the tool by opening the valve of the tool air motor, the pilot air flow rate, still under the reduced pilot pressure, is correspondingly increased to its so-called "demand flow rate" due to the large orifice presented by the open air motor valve.

The control unit is provided with sensing means for discriminating between the varying leak pilot flow rates and the demand pilot flow rate. A sensing means operates such that when a pilot leak flow rate is sensed, indicative of a tool non-use condition, the main valve of the control unit will maintain the drop isolated from the line pressure. However, when the demand pilot flow rate is sensed, indicative of a tool usage demand condition, the main valve is caused to open thereby communicating the drop with the line pressure to drive the tool.

Figure 2:
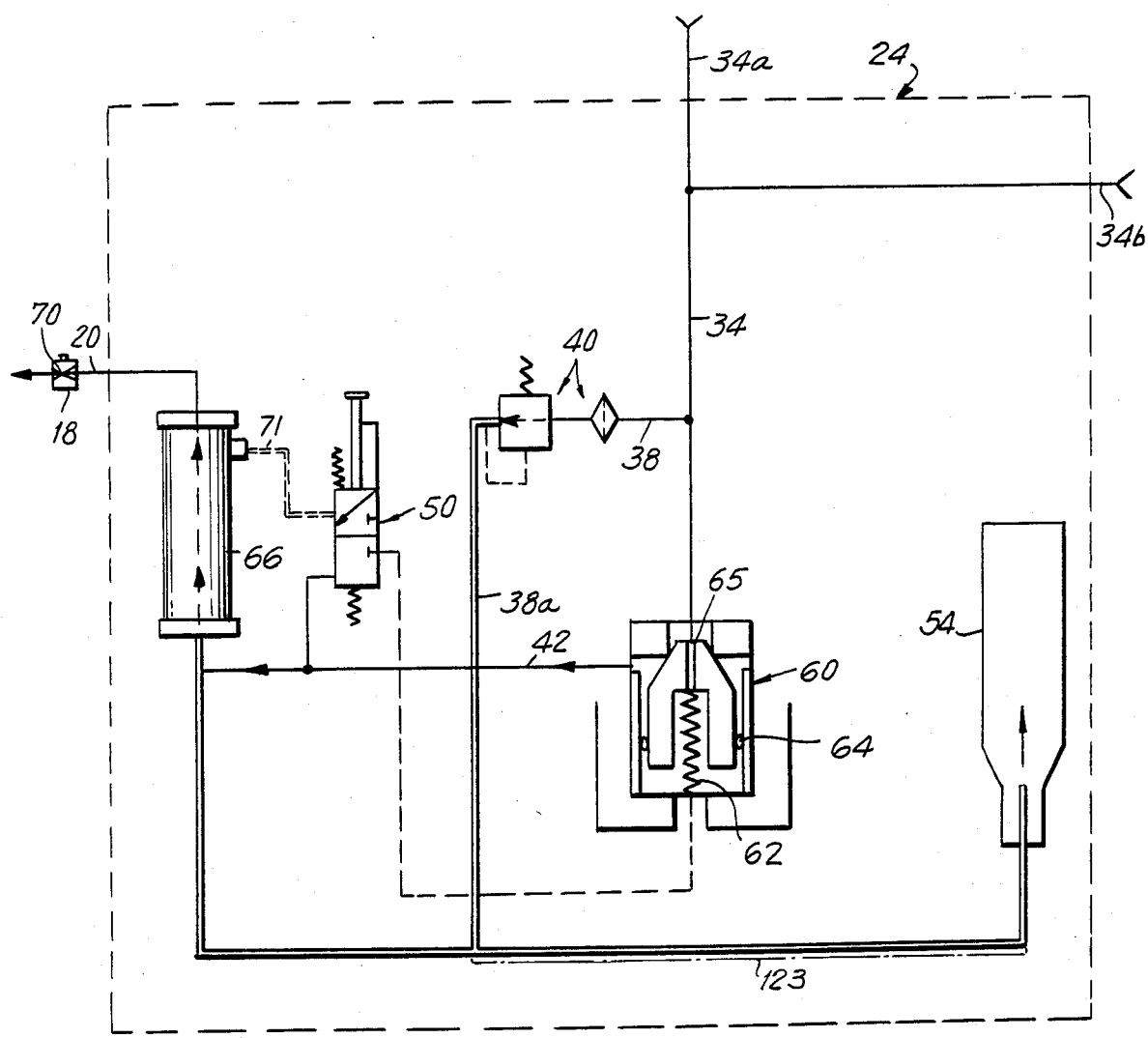
FIG. 2 is a schematic flow circuit diagram of a control unit in accordance with a first embodiment of the invention incorporating internal-demand condition sensing means.

A control unit 24 according to a first embodiment of the invention, i.e., an internal signal-type control unit, will now be described with reference to FIGS. 2, 10 and 11. In FIG. 2, main air flow at line pressure is designated by a single solid line, pilot air flow is designated by a double solid line, control air flow is designated by a single dash line and electrical connections are designated by a double dash line.

Air at line pressure, e.g., 100 psig, enters a feed pipe 34 through one of either an upper or side connector 34a, 34b. Thus, either one of the upper or side connectors 34a or 34b are coupled to the inverted U-shaped branch 22 (FIG. 1) of the overhead pipe network while the other connector is closed by a suitable plug. Feed pipe 34 communicates through a feed bore 35 (FIG. 11) with a bypass bore 38 formed in a manifold block 36. The bypass bore 38 contains a filter and pressure regulator unit 40 which reduces the line pressure to a pilot pressure, e.g., 5 psig. As seen in FIGS. 10 and 11, the bypass bore 38 is closed at the end which opens from manifold block 36 by a plug 39 and includes a bypass bore portion 38a downstream of the pressure regulator 40 in which air at pilot pressure flows. The pilot pressure can be adjusted by appropriately setting the knob 40a. The downstream bypass bore portion 38a communicates with a main bore 42.

Figure 10:
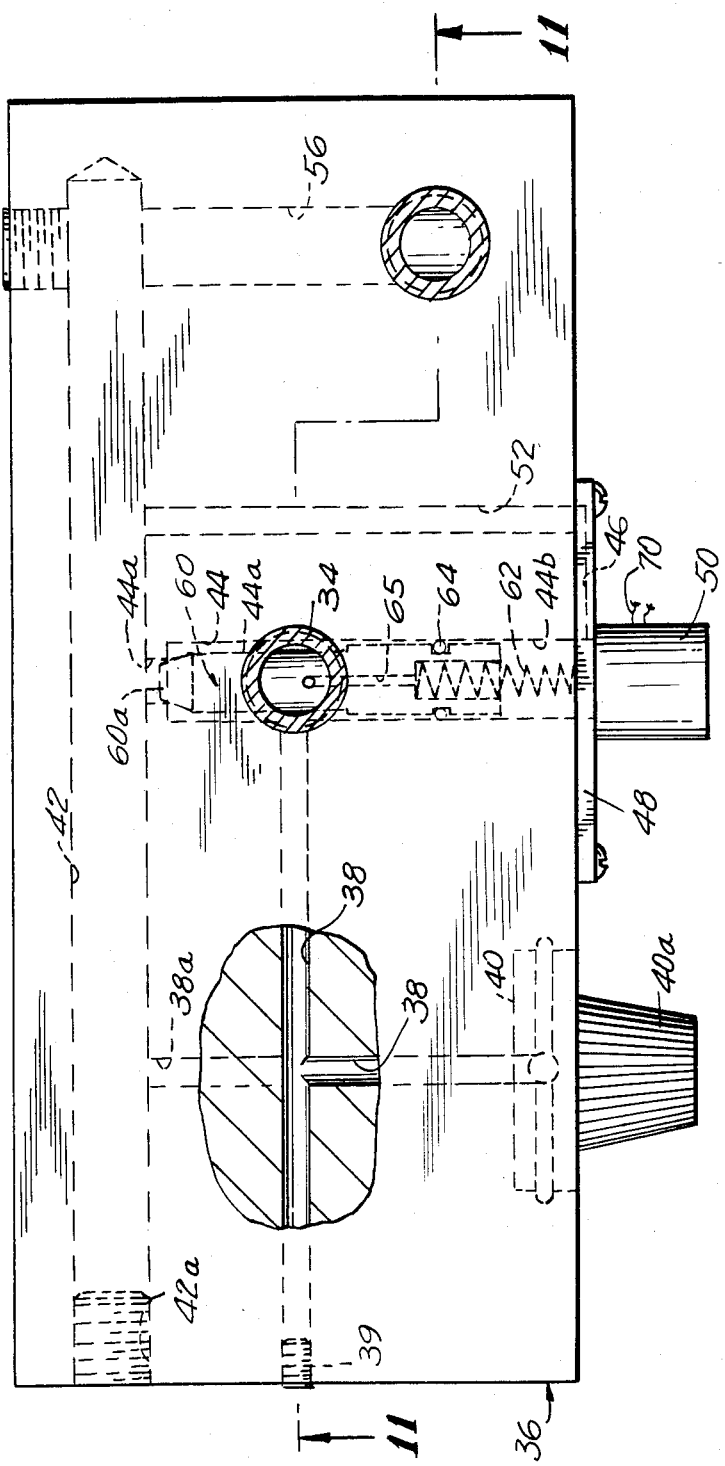
FIG. 10 is a section view taken along line 10—10 of FIG. 3 and constituting a top plan view partially cut away of the manifold housing of the control unit.
Figure 11:
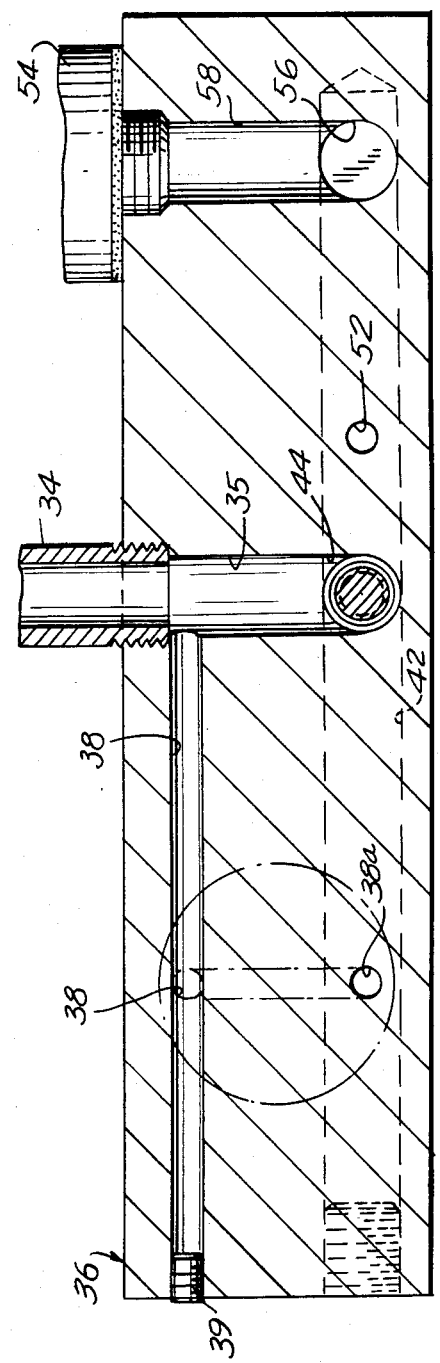
FIG. 11 is a section view taken along line 11—11 of FIG. 10.

The feed bore 35 also communicates with a main valve bore 44, one end of which communicates with main bore 42 through a reduced diameter passage 44a (FIG. 10). The other end of main valve bore 44 opens onto a forward side of manifold block 36 and communicates through a passage 46 formed by a groove machined in a plate 48 fastened to block 36 with one end of a bore 52 whose other end opens into main bore 42. The main bore 42 also communicates with a storage or accumulator tank 54 through bores 56 and 58.

Referring to FIGS. 2 and 10, a main valve, constituted by a conventional poppet valve 60, is housed within main valve bore 44. Poppet valve 60 includes a cylindrical body having a tapered end 60a which in its forward position illustrated in FIG. 10 functions to seal the main bore 42 from the poppet valve bore 44. The poppet valve 60 is biased towards its forward or sealed position by a spring 62. An O-ring 64 extends around the body of valve 60 and divides the bore 44 into a forward chamber 44a and a rearward chamber 44b. A small diameter bore or orifice 65 is formed through the body of poppet valve 60 which provides fluid communication between the forward chamber 44a of bore 44 (which communicates with feed bore 35) and the rearward chamber 44b. A solenoid valve 50 normally seals the rearward chamber 44b from the passage 46.

Figure 3:
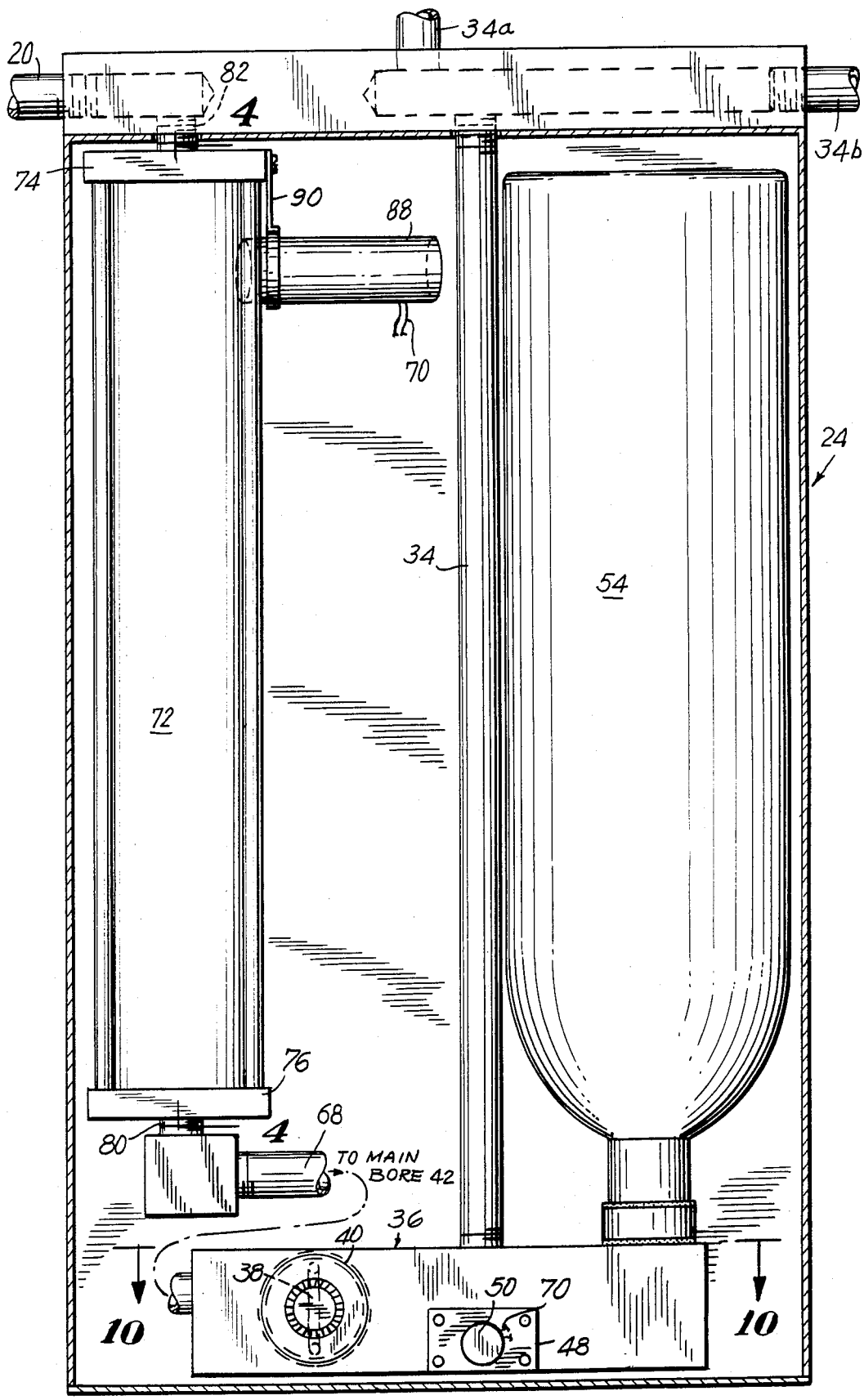
FIG. 3 is a side elevation view in partial section of the control unit shown in FIG. 2.

The end region of main bore 42 is threaded and opens onto a lateral side of the manifold at 42a and is fluidly coupled to flow sensing means 66 through a pipe 68 (FIG. 3). Flow sensing means 66 are connected to the air tool 18 through the air drop 20. As described in greater detail below, flow sensing means 66 discriminates between leak and demand pilot flow rates and generates an electrical signal when a demand pilot flow rate is sensed, the electrical signal being applied to the solenoid valve 50 through electrical conductors 71.

In operation, as described above, air at line pressure enters the bypass bore 38 from the overhead pipe network through feed pipe 34. When the tool is in its non-use condition, the main bore 42 is isolated from the line pressure by the main or poppet valve 60 whose tapered end 60a seats within the reduced bore portion 44a as shown in FIG. 10 under the force of spring 62. It is noted that the pressure on both sides of the poppet valve O-ring 64 is equalized due to the communication of the forward and rearward chambers 44a and 44b through the orifice 65. Thus, line pressure is present in both the forward and rearward chambers 44a and 44b and this pressure equalization allows the spring 62 to urge the main or poppet valve 60 to its sealed position. The solenoid valve 50 is normally in a closed position isolating bore 44 from passage 46. The pressure regulator 40 in bypass bore 38 reduces the line pressure to pilot pressure which thereby exists in the main bore 42, bore 52 and communicating passages in bores 46, 56 and 58, as well as in accumulator tank 54. The pilot pressure is transmitted through the main bore 42 to the air drop 20 through the flow sensing means 66.

The non-use condition of tool 18 is characterized by the tool valve 70 being closed. In this condition, any points of leakage present in the air drop 20 will result in a small, typically varying leak flow rate of the pilot air flow in the drop. In the case where no leaks exist in drop 20 the leak pilot flow is zero. The varying leak pilot flow sensed by flow sensing means 66 is adapted to generate an electrical signal only upon sensing a larger or demand leak flow rate indicative of a tool demand condition. Thus, when the flow sensing means 66 senses a non-use condition characterized by a very small or zero leak flow rate, the solenoid valve 50 remains closed and the main or poppet valve 60 maintains the main bore 42 and air drop 20 isolated from line pressure.

A tool usage demand condition occurs when the tool operator actuates the tool by opening the air motor valve 70. When the tool valve 70 is opened, the large orifice presented thereby results in a significant increase in the pilot air flow rate in the drop, i.e., a so-called demand pilot air flow results. As noted above, the flow sensing means 66 is adapted to discriminate between the lower leak and larger demand flow rates. When the sensing means 66 senses a demand pilot air flow, an electrical signal is generated which is applied to the solenoid valve 50 through electrical conductor 71 causing the solenoid valve to open. Upon opening of the solenoid valve, the rearward chamber 44b of main valve bore 44 come into communication with the main bore 42 through a relatively large orifice, passage 46 and bore 52. This in turn results in an immediate and large reduction in pressure in the rearward chamber 44b which causes an imbalance in the forces acting on the poppet valve. In other words, line pressure which exists in the forward chamber 44a of main valve bore 44 acts on the poppet valve in a direction opposite to the direction in which the poppet valve is urged by spring 62 while a reduced pressure exists in rearward chamber 44b due to the rapid venting described above. The poppet valve 60 is quickly moved rearwardly to an unsealed position under the force of the line pressure in the forward chamber 44a against the force of spring 62. The orifice 65 is sufficiently small so that there is not enough time for the pressure on either side of the poppet valve to equalize before the poppet valve has attained its unsealed position.

When the main or poppet valve 60 is moved to its unsealing position, the main bore 42 communicates with the feed bore 35 and air at line pressure flows into the main bore 42 and through the sensing means and air drop to the tool to operate the same.

The accumulator tank 54 stores air at a range of pressure from pilot to line pressure through its communication with main bore 42 depending upon whether tool non-use or demand conditions exist. The continuous communication of tank 54 with the main bore 42 permits the air stored therein to reexpand back to the flow sensing means 66 when required as described below in connection with the construction and operation of the flow sensing means.

Referring now to FIGS. 3-9, an embodiment of the flow sensing means 66 forming a part of control unit 24 will now be described. Sensing means 66 functions to discriminate between varying leakage pilot air flow, indicative of a tool non-use condition, demand pilot air flow, indicative of a tool usage demand condition, and residual pressure leakage air flow, described below, and to send a signal to a main valve as described above upon sensing a demand pilot air flow whereby the valve opens to communicate the air drop with the line pressure.

Flow sensing means 66 comprises a cylindrical tube 72 whose ends are situated in grooves formed in top and bottom end caps 74 and 76. The grooves are fitted with O-rings and tie rods 78 urge the end caps 74 and 76 towards each other so that the O-rings form seals between the end caps and tube 72. The bottom end cap 76 is formed with a central bore therethrough in which a threaded connector 80 is provided to function as an air inlet to the sensing means. Similarly, the top end cap 74 has a central bore formed therethrough fitted with a threaded connector 82 which functions as an air outlet.

Figure 4:
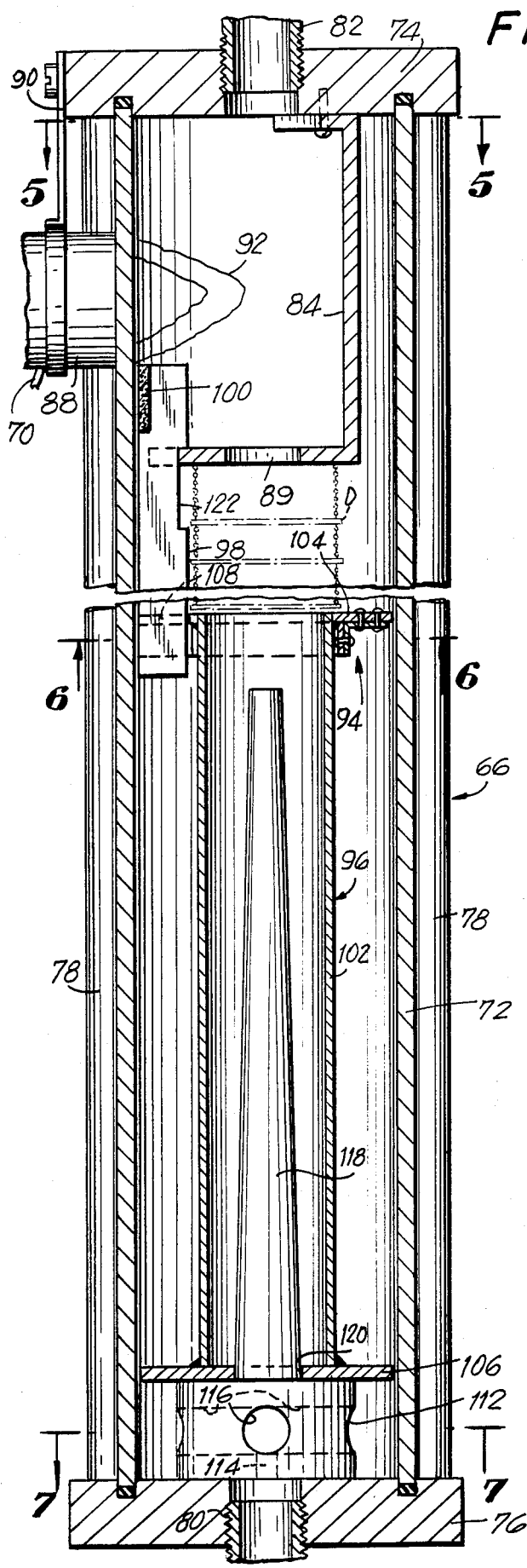
FIG. 4 is a section view taken along line 4—4 of FIG. 3 and illustrating the detailed construction of a flow rate detector switch constituting a component of the control unit.
Figure 5:
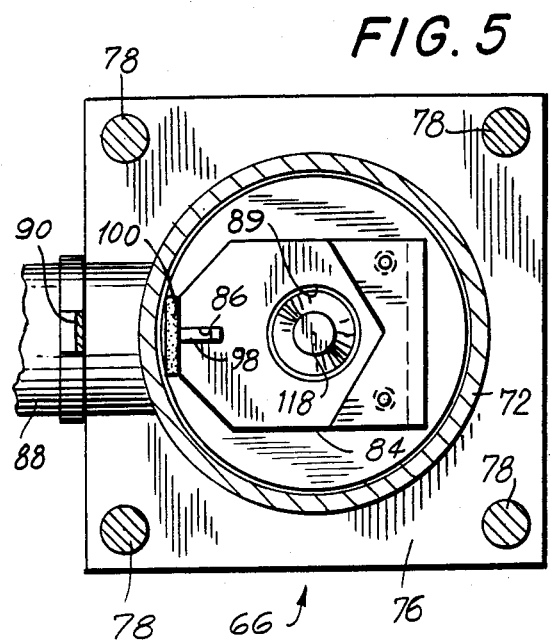
FIG. 5 is a section view taken along line 5—5 of FIG. 4.
Figure 6:
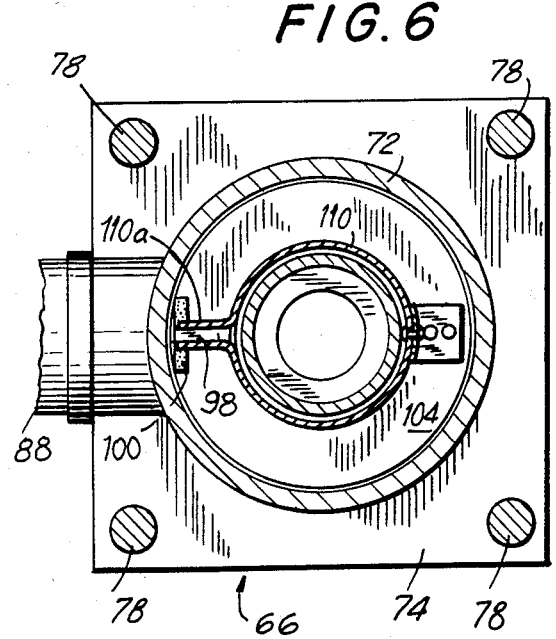
FIG. 6 is a section view taken along line 6—6 of FIG. 4.

Retaining means, such as an L-shaped bracket 84, is fastened to the top end cap 74 so as to be suspended in the upper region of the interior of tube 72 as seen in FIGS. 4 and 8. The short leg of bracket 84 has a slot 86 (FIG. 5) formed therein which functions as a guide for a target slide as described below. A relatively large central opening 89 is formed through the short leg of bracket 84 to allow for the free passage of air flow towards the outlet 82.

An eddy current proximity switch 88 is fastened to the outside of tube 72 at its upper region by means of a bracket 90 (FIG. 3) fixed to the top end cap 74. The proximity switch 88 is a conventional metal sensing switch of the type illustrated in Bulletin SW-5 of Gordon Products, Inc. of Brookfield, Conn. Such eddy current operated proximity switches include an internal signal generator which creates a sensing field, designated 92 in FIG. 4 at the front end of the unit. Any conducting metal which comes into this field will have eddy currents produced within the metal. The energy consumed by these eddy current losses is detected by the switch which generates an output signal in response thereto.

A target strip assembly 94 is situated within the interior of tube 72. The target strip assembly 94 includes a plunger assembly 96 operatively associated with a target strip 98 having a target member 100 formed of any suitable dense magnetic metallic material fixed to its end.

The plunger assembly 96 comprises a cylindrical piston-type plunger 102 to which top and bottom end plates 104 and 106 are attached to axially align the plunger assembly with the longitudinal axis of the tube 72. A nominal clearance between the top and bottom end plates 106 and 104 and the tube 72 provides for a substantially frictionless contact when the plunger assembly 96 moves within tube 72. The top end plate 104 is provided with a slot 108 in alignment with bracket slot 86 and in which a lower portion of the target strip 98 is slidably received. The target strip 98 is held in association with plunger 96 by means of a spring-type collar 110 best seen in FIG. 6 having a pair of opposed free end portions 110a which hold the target strip 98 in friction engagement. As seen in FIG. 4, the target strip 98 extends through the slot 86 of bracket 84.

The plunger assembly 96 rests on an air inlet base 112 having an axial bore 114 in communication with the air inlet 80 and four radially extending bores 116, each of which communicates the axial bore 114 with the interior of tube 72. A tapered metering rod 118 has its lower end fixed to the base 112 and extends upwardly within tube 72 and passes through a central opening 120 formed in the bottom end plate 106. The tapered metering rod 118 acts to provide an air passage between the spaces below and above the bottom end plate 106, which air passage varies in size in accordance with the instantaneous air flow rate as described below and which in turn determines the upward or downward direction of the plunger assembly and the particular equilibrium thereof relative to air flow.

The length of the target strip 98 is such that when the plunger assembly 96 is at or close to its rest position as seen in FIG. 4, the target member 100 is outside of the sensing field 92 of proximity switch 88. As seen in FIGS. 4 and 8, a longitudinally extending notch 122 is formed in the target strip 98, which notch limits the extent of movement of the target strip with respect to the slot 86 of bracket 84. Thus, with the plunger assembly 96 in its lower position as seen in FIG. 4, the upper end of notch 122 engages the top surface of the short leg of bracket 84. As the plunger assembly 96 moves upwardly, the lower end of notch 122 eventually engages the lower surface of the short leg of bracket 84 preventing further upward movement of the target strip 98 and continued upward movement of the plunger assembly 96 is permitted due to the sliding engagement by which the opposed portions 110a of the collar 110 hold the target strip 98. Thus, continued upward movement of the plunger assembly 96 can occur with the maximum upward position of the target strip 98 being limited to that illustrated in FIG. 8.

In this manner the target member 100 is adapted to move between a lower position (e.g. that of FIG. 4) outside of the sensing field 92 of proximity switch 88 and an upper position (FIG. 8) within the sensing field 92 of the proximity switch. As noted above, the target strip 98 is in light frictional contact with the spring-type collar 110 affixed to the upper end of the plunger assembly 96 so that the long stroke of the plunger assembly upwards results in an instantaneous movement of the target member into the sensing field 92.

In operation the plunger assembly 96 has a construction and weight adapted for the leakage and demand pilot air flows which will exist in a particular air drop. Assuming a tool non-use condition, a leakage pilot air flow enters the sensing means 66 through the inlet 80 through the bores 114 and 116 of base 112, the metered passage between opening 120 and metering rod 118 and out through the outlet 82 into the air drop. The plunger assembly 96 "floats" within the tube 72 at a position slightly elevated from the rest position, the non-use leakage air flow position of the plunger being such that the target member 100 remains outside of the sensing field 92 of proximity switch 88. In the case where no leakage is present in the air drop, the plunger assembly 96 remains in its rest position illustrated in FIG. 4. The air flow entering the sensing means 66 passes through the variable orifice defined by the metering rod and central opening of the bottom plate through which it passes as the plunger moves along the longitudinal axis of the tube 72. The uniformly diminishing cross section of the tapered metering rod constantly enlarges the air passage orifice as the flow rate increases thereby producing a series of thrust-to-weight ratios which will assure that the plunger will attain a floating equilibrium position even as the non-use leakage flow rate varies over time.

When a tool usage demand condition exists, i.e., when the tool operator operates the valve of the tool air motor, the air flow rate through the sensing means 66 instantaneously increases to the demand pilot air flow rate. This increased air flow causes the plunger assembly 96 to move immediately upwardly from the floating level attained in the leakage air flow. The upward motion of the plunger assembly imparts a simultaneous motion to the target strip 98 through the gripping action of the spring-type collar 110. Although the plunger assembly 96 can move over a relatively large stroke, the target strip 98 is limited to a stroke sufficient to situate the target member 100 within the sensing field 92 generated by the proximity switch 88. Thus, as soon as a tool usage demand condition exists, the proximity switch 88 generates a signal which is transmitted by means of conductor 70 to the solenoid valve 50 which opens the main bore 42 to line pressure which is transmitted through the sensing means 66 to the air drop and tool to operate the latter.

The target member 100 remains within the sensing field 92 as long as the usage demand condition exists. Release of the tool valve, i.e., a return to a tool non-use condition, causes the large air flow through the tool to cease whereupon the target member is removed from the sensing field thereby shutting off air to the tool. A leakage air flow is eventually established and the plunger assembly 96 moves to a lower level.

It is not unusual under normal tool usage conditions that the tool is turned on and off several times over a short period of time. In order to eliminate a corresponding on and off cycling of the solenoid valve 50 which would deleteriously affect its life, the proximity switch is provided with a time-delay feature in the form of a pulse counting cumulative timer. The timer maintains the generation of an electrical signal for a certain predetermined period, e.g. six to ten seconds, after the target member 100 moves out of the sensing field 92 so that if the tool is turned off and then turned on prior to the expiration of the predetermined time period, the solenoid valve will not have closed. After the expiration of the last timerpulse, the electrical signal from proximity switch 88 ceases and the main poppet valve seals the main bore from line pressure. If the tool is reactivated prior to the expiration of the predetermined time period, the interruption of the timing sequence acts to reset the cumulative timer.

Although the sensing of varying leak rates triggers the introduction of line pressure into the drop, a return to the original or non-demand pilot leak rate setting occurs only after some period of time has elapsed. Thus, although the solenoid valve 50 quickly closes after tool valve 70 has closed (target member 100 quickly leaves magnetic field 92 and the solenoid valve closes some six to ten seconds thereafter), a gradually decreasing residual pressure exists in the drop for a period of time, e.g., 30 seconds to five minutes, depending on the system leak rate, until leakage eventually causes the pressure to diminish to pilot pressure. If the tool is reactivated with the solenoid valve 50 closed but with the drop at some pressure above pilot pressure, e.g., at or near line pressure, i.e., with some residual pressure remaining, the compressed gas which has been stored in the accumulator tank 54 reexpands to increase the flow rate to raise the plunger causing the solenoid valve to open. This air flow from tank 54 is designated by the broken line 123 in FIG. 2.

The embodiment of the invention as described above can be varied as will be readily understood. For example, the sensing means may be other than as described. Thus, other means may be used for target detection, e.g., an internal magnet mounted on the plunger and a sensor mounted on the exterior or interior wall of the tube. In the case of interior sensor mounting, a sealed wire terminal is provided to the exterior of the tube to prevent leakage.

Referring to FIG. 12 alternate embodiments of flow sensing means for use in an internal signal-type control unit are illustrated. A first alternate embodiment comprises flow sensing means 660 wherein a vane 124 is pivotally mounted within a housing 126 biased towards the solid-line position by means of a torsion spring 128. One side of vane 214 is situated within an air flow passage 130 through which the pilot leakage and demand air flows are adapted to pass. The pivotal vane 124 is coupled to means for varying electrical voltage or frequency based on the angular excursion of the vane and electronic devices are provided to detect or sense increased or decreased air flow rates and energize or deenergize a solenoid valve in response thereto. In particular, a leakage pilot air flow establishes a "floating" datum position for the vane 124. The voltage or frequency associated with the datum position is directed to a microprocessor which interprets the signal and transmits the same through a relay to a solenoid valve such that the solenoid valve remains closed maintaining the air drop isolated from line pressure. When the air flow increases to a demand pilot air flow indicative of a tool usage demand condition, the vane is rotated to a position wherein the voltage or frequency transmitted to the microprocessor changes to one which is relayed to the solenoid valve to cause the latter to open thereby communicating the air drop with line pressure. A decrease in the air flow results in a return movement of the vane resulting in an electronic interpretation of a leak rate air flow resulting in a deactivation of the solenoid valve.

Another alternate embodiment of sensing means for use in an internal signal-type control unit is shown in phantom and designated 661. Sensing means 661 is substantially entirely electrical and comprises a heated wire 132 which passes through an air flow passage 134 formed in a housing 136. A variation in the rate of air flow passing over the heated wire 132 causes a corresponding variation in the temperature of the wire which in turn results in a variation in the resistance presented by the wire. Thus, when a leakage pilot air flow passes through the passage 134, wire 132 has a first resistance which is interpreted by the microprocessor such that the solenoid valve remains closed with the air drop thus being isolated from line pressure. When the air flow increases to a demand pilot air flow indicative of a tool usage demand condition, the resistance of the wire 132 changes due to the difference in temperature sensed thereby, the new resistance being interpreted by the microprocessor to cause the solenoid valve to open to communicate the air drop with line pressure.

It is seen from the foregoing that the air flow sensing means can have any suitable configuration so long as the same is sufficiently sensitive to changes in air flow so as to be able to discriminate between leakage and demand air flows and to generate a signal in response thereto. For example, an all-air logic circuit may be used as the flow rate sensing means utilizing air logic components in lieu of electrical or mechanical devices. It is important, however, that the air flow sensing means, whether it is of the plunger, vane, resistance wire or all-air logic circuit or equivalent thereof, be capable of responding to varying leakage and demand flow rates and respond thereto in a definite and constant relationship. For example, the eddy current type proximity switch of the illustrated embodiment could be replaced by a photosensitive device and/or a magnet could be attached to the plunger adapted to actuate an appropriate switching arrangement.

Returning to the flow sensing means 66, in certain cases it may be desirable to fix a calibrated spring or a series of disk-shaped weights D (shown in phantom in FIG. 4) to bracket 84 so that as plunger 96 rises to the point where target member 100 enters field 92, it sequentially engages individual ones of the disks to progressively impart negative buoyancy to the plunger assembly as it continues to rise. The negative buoyancy is advantageous in insuring movement of the target out of the target area when a demand condition ceases. In particular, in cases where leakage air flow approaches the demand air flow, the spring or weights provide a negative buoyancy to the plunger assembly to thereby remove the target member from the sensing field 92 of proximity switch 88. Moreover, the use of a spring or weights will extend the range of operation of the sensing means.

In the case where the invention is applied to a system for driving relatively small tools, i.e., tools having small fluid flow orifices, it is possible that the demand pilot flow rate created by tool actuation will not be great enough to cause the flow rate sensing means to generate the solenoid valve opening signal. In such a case, a starter valve may be provided in the drop proximate to the tool which when opened provides a larger fluid flow orifice. Thus, referring to FIG. 1, a starter valve 138 having a large fluid flow orifice is provided proximate to tool 18a. When tool 18a is to be started from a zero pressure condition, the valve 138 is actuated to cause a relatively large demand flow rate to thereby open the solenoid valve in the control unit 24a.

Referring to FIGS. 13 and 14, a compressed air system utilizing a second embodiment of the invention is illustrated wherein the control units are adapted to interface with external signaling devices. Such external signal-type control units are useful in cases where the operator does not have to move a great distance from the work station during tool operation.

According to the second embodiment of the invention, the tool 18 is associated with an external signaling device 140 which may take any convenient form such, for example, as a tool hanger, tool rest, foot treadle, motion sensor or the like.

The control unit 25 has an air intake passage 141 formed in a housing 142 into which air and line pressure is directed from the overhead pipe network. The air drop 20 is isolated from the line pressure by means of a main valve in the form of a poppet valve 144 of the same type as poppet valve 60 of the embodiment of FIGS. 2-11. The poppet valve is controlled by a solenoid valve 146 which is preferably operated by a low voltage, e.g., 24 volt, circuit connected to a step down transformer 148. A manual override line (not shown) can be provided to actuate the poppet valve should the same be desired such, for example, as during a malfunction of the solenoid coil or power failure. A barrier strip 148 is provided to connect various branches of the electrical circuitry to an electrical circuit and a pilot light 150 is provided to indicate whether the solenoid is on or off.

Thus, activation of the external signaling device 140, such as by lifting the tool from a tool rest or hanger or actuation of a foot treadle causes an electrical signal to be transmitted through a conductor 32 to the barrier strip to operate the solenoid 146 which functions to open the poppet valve 144 to provide communication between the air drop 20 and line pressure within passage 141. When the air tool is reassociated with the external signaling device, the solenoid valve is deactivated and the poppet valve returns to its original sealed position thereby isolating the air drop from the line pressure.

Referring to FIGS. 15-17, an external signaling device 140 is constituted by a tool rest 26 (see FIG. 1). The tool rest is positioned at a work station and as described above provides a signal indicative of either a tool nonuse condition or a tool usage demand condition. The tool rest is suitable for use with air tools 18 which do not have attachment hooks and/or which are of the heavier type. Tool rest 26 comprises a substantially L-shaped support member 151 including a tool supporting leg 154, a switch actuating leg 156 and an angled connecting leg 158. The support member 152 is pivotally mounted to a housing 160 by means of a pivot axle 162 passing through depending ears 164 integral with the connecting leg 158. A counterweight 166 is fixed to the free end of the connecting leg 158 so that support member 152 is normally pivoted towards its raised position illustrated by the dot-dash lines which is indicative of a tool usage demand condition as described below.

A normally closed leaf-type switch 168 is situated within housing 160 so that its leaf actuator 170 is presented in opposed relationship to the switch actuating leg 156 of the support member 152. The housing is provided with a pair of lateral flanges 172 which provide convenient means for fixing the tool rest to a bench or the like by means of C-clamps 174.

In operation, when a tool non-use condition exists, the tool 18 rests on the tool supporting leg 154 of support member 152 as indicated in phantom in FIGS. 15 and 16. The weight of the tool 18 pivots the support member 152 to its solid-line position against the resisting torque provided by counterweight 166. In this position the switch actuating leg 156 pivots the switch actuator 170 to its inner position which opens normally closed switch 168 and the circuit comprising conductors 30 thereby maintaining the solenoid valve 146 and poppet valve 144 closed isolating air drop 20 from line pressure. When the tool 18 is to be used, it is lifted from the support member 152 whereupon the latter pivots to its in-use position illustrated in phantom in FIG. 16 under the weight of counterweight 166. This action allows leaf actuator 170 to move outwardly closing switch 158 and the circuit to solenoid valve 146. Opening of the solenoid valve in turn results in an opening of poppet valve 144 whereupon air drop 20 is communicated with line pressure to power the tool 18. When tool use has been completed, a tool is replaced on support member 152 opening switch 168 and isolating the air drop 20 from line pressure as will be readily understood.

Figure 18:
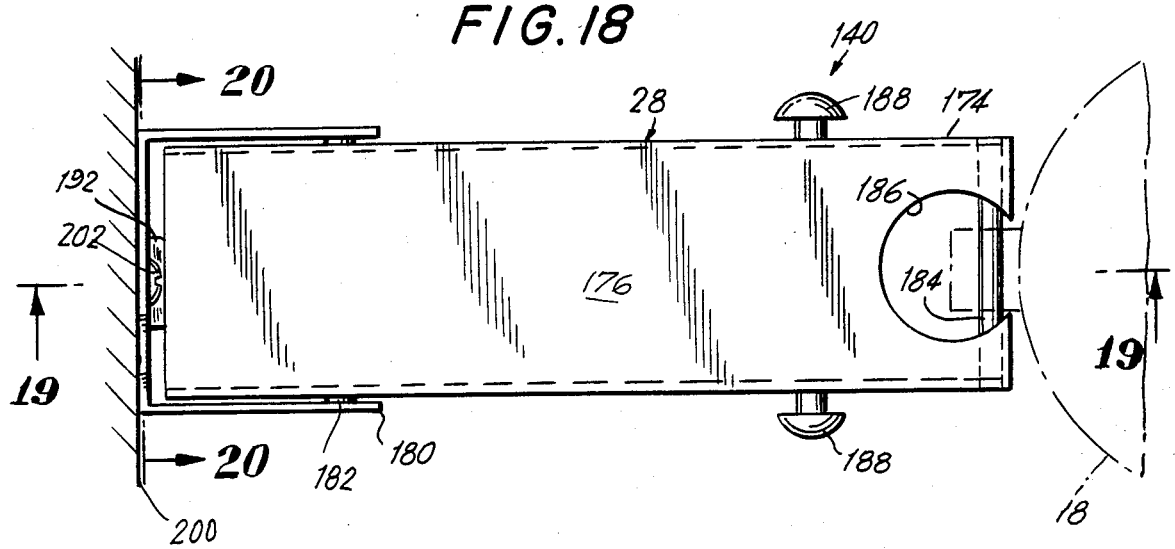
FIG. 18 is a top plan view of a second modification of the second embodiment of the invention wherein the sensing means are in the form of a tool hanger.
Figure 19:
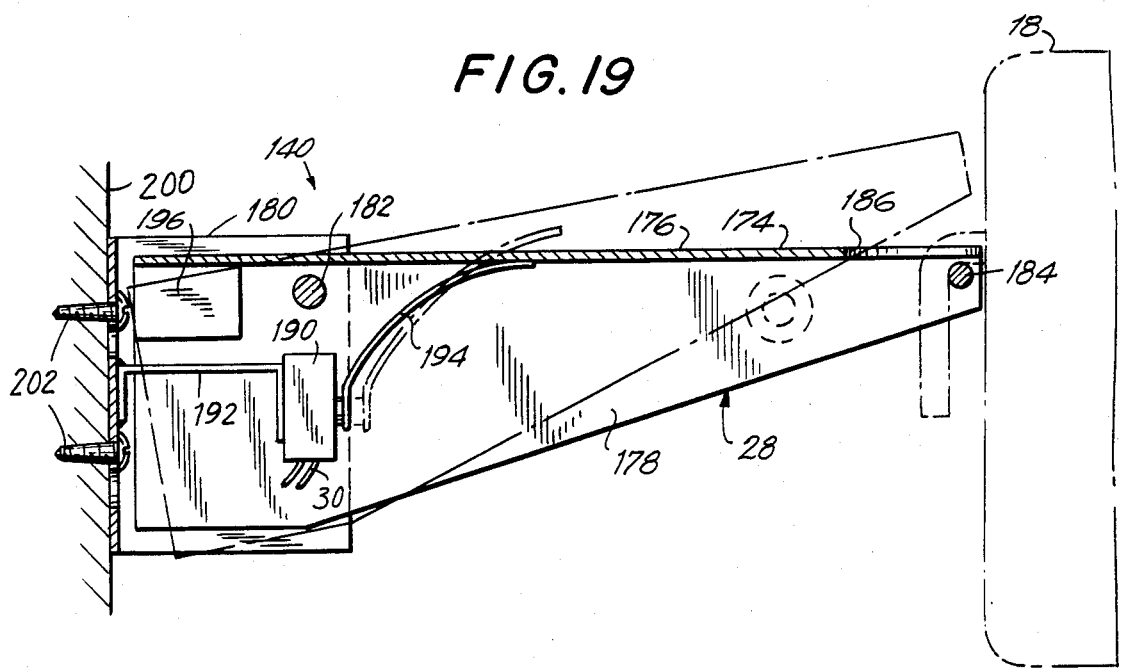
FIG. 19 is a section view taken along line 19—19 of FIG. 18.
Figure 20:
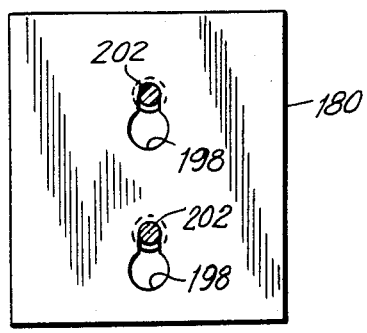
FIG. 20 is a section view taken along line 20—20 of FIG. 18.

Referring to FIGS. 18-20, an external signaling device 140 in the form of a tool hanger 28 is illustrated. Tool hanger 28 is adapted for use as an external signaling device to signal non-use and usage demand conditions of tools having hook structures for hanging the tool when the same is not being used. Tool hanger 28 includes a support member 174 including a tool supporting leg 176 having a pair of flanges 178 depending downwardly from its lateral side edges. The support member 174 is pivotally mounted in a U-shaped bracket 180 by means of a pivot axle 182. A tool supporting bar 184 extends across a clearance slot 186 at the free end of supporting leg 176 and a pair of tool supporting buttons 188 extend outwardly from respective flanges 178.

A normally closed switch 190 is mounted on bracket 180 by a mounting member 192. Switch 190 includes a leaf-spring actuator 194 adapted to engage the lower surface of the supporting leg 176 when the support member 174 is pivoted to the tool non-use position shown in solid lines in FIG. 19. A counterweight 196 acts to pivot the support member 174 to a tool usage demand position illustrated in phantom in FIG. 19 when the tool 18 is lifted from the tool hanger. The bracket 180 is provided with bayonet mounting holes 198 so that the tool hanger can be conveniently mounted to a wall 200 by fasteners 202.

In operation, when the tool 18 is not in use, it is hung on the bar 184 as shown in FIGS. 18 and 19 or on buttons 188 whereupon the support member 174 is pivoted under the weight of the tool to its non-use position shown in solid lines in FIG. 19. The bottom surface of the tool supporting leg 176 engages the switch actuator 194 to open switch 190 opening the solenoid valve circuit which in turn maintains the poppet valve 144 in its closed position isolating the air drop 20 from line pressure. When the tool is to be used, it is lifted from the support member 174 whereupon the latter pivots to its tool usage demand position shown in phantom in FIG. 19 under the force of counterweight 196 whereupon the actuator 194 becomes disengaged from the tool supporting leg 176 thereby closing switch 190 and the solenoid valve circuit. The poppet valve 144 is opened whereupon the air drop 20 is communicated with line pressure to power the tool 18.

Referring to FIGS. 21 and 22, another embodiment of an external signaling device 140 is illustrated and comprises a motion sensor switch 206 adapted to be attached by a clamp 208 to an end region of air drop 20 adjacent to air tool 18. The motion sensor switch 206 is adapted for use in those applications where the air drop is vertically suspended from an overhead air supply pipe and where freedom for an operator at an air station to roam about is essential. The tools attached to drops associated with motion sensor switches are usually counterbalanced for reducing the weight of the tool and for automatic overhead storage when not in use. The conductors 33 for transmitting a signal indicative of a tool usage demand condition are preferably provided in the form of a coiled cord having the capability to stretch with movement of the tool and to retract to a stored position when the tool is not in use.

The motion sensor switch constitutes a device which provides an instantaneous electrical pulse in response to motion of the tool during a work cycle. When tool motion ceases, the air supply is shut off after a short time period.

Referring to FIG. 22, the motion sensor switch 206 includes a base 210 and cover 212 adapted to be fastened to the base by means of a threaded fastener 214. A permanent magnet 216 is slidably mounted on a rod 218 to move in accordance with motion (acceleration/deceleration) imparted to the tool and to magnetically influence a reed type switch 220. Thus, when the tool is moved in a manner to cause the permanent magnet 216 to move to the position shown in phantom in FIG. 22, an electrical circuit is closed which generates a pulse which is delivered through conductor 30 to a timing device provided in the control unit. The timing device functions to initiate a timing cycle on deenergization of the circuit for a preset time period. The introduction of a second pulsed signal will reset the timing cycle until no pulses are received thereby shutting off the air supply to the drop in the same manner as described above.

Figure 23:
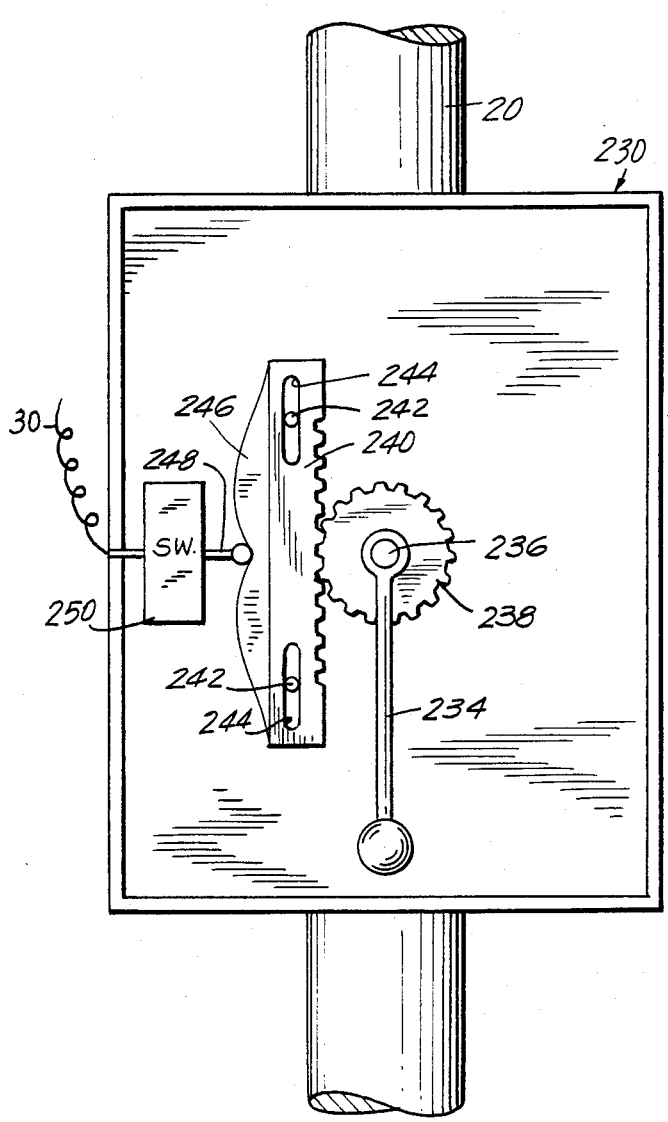
FIG. 23 is a schematic front elevation view of a second form of motion sensing means with its housing cover plate removed to expose the components thereof.
Figure 24:
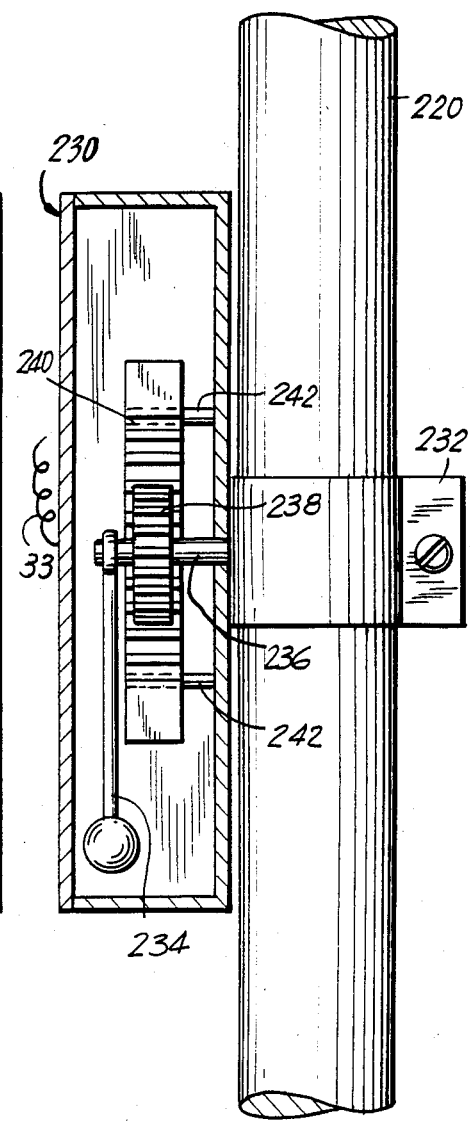
FIG. 24 is a side elevation view of the motion sensing means illustrated in FIG. 23.

Referring to FIGS. 23 and 24, another type of motion sensor switch 230 is illustrated which is connected to an end region of an air drop 20 adjacent to an air tool (not shown) by means of a clamp 232. Motion sensor switch 230 comprises a housing in which a pendulum 234 is pivotally mounted on a shaft 236 on which a spur gear 238 is also mounted so that pivoting motion of pendulum 234 causes corresponding rotation of spur gear 238. The teeth of a gear rack 240 mounted for linear reciprocating motion by means of pins 242 fixed to the housing extending into slots 244 formed in the rack engage the spur gear 238. The rack is formed with a cam surface 246 which is engaged by a cam follower 248 of a switch 250.

The pendulum 234 maintains a basic reference axis regardless of any change in the angular attitude of the motion sensor 230 so that movement of the tool will impart motion to the pendulum which rotates spur gear 238 which in turn moves rack 240 along its linear axis which closes the switch 250 through engagement of follower 248 with the cam surface 246.

Thus, the pendulum and spur gear assume a fixed axis with any subsequent motion resulting in rotation of the spur gear. However, the rack 240 and switch 250 are free to swing around a common pitch circle having a fixed radius thereby causing no change in the relative positions of the gear and rack. This freedom of movement of the rack and switch to any angular position around a fixed radius allows the motion sensor to assume any angular attitude without actuating the switch. However, any pendulum motion resulting from tool operation will cause movement of the rack to close the switch. This feature is advantageous since suspended tools will assume different angular positions so that without an established perpendicular axis, the tool could assume a rest position which would prevent the switch from shutting off. In other respects the motion sensor functions similarly to that illustrated in FIGS. 21 and 22.

The external signaling device embodiments of the invention may employ switch means other than electrical switches. Thus, the switches 168, 190, 220 and 250 used in the illustrated embodiments can be replaced by other types of switches such, for example, as air-operated switches.

It is seen from the foregoing that the method and apparatus of the present invention will effectively control leaks in pressurized fluid systems in a simple manner which does not require the modification of existing tools or equipment. In the case of the compressed air system described, the air drop is automatically selectively isolated and communicated with line pressure solely in response to signals indicative of tool non-use and usage demand signals. In the case of the internal signal-type control units described, where the tool non-8se condition exists, the air drop is exposed to a relatively small pilot pressure thereby significantly reducing leakage losses. In the case of the external signal-type control units, the air drop is totally isolated from line pressure. The flow sensor devices used in connection with the internal signal-type control unit provide a sensitivity sufficient to discriminate between pilot leakage air flow rates and usage demand air flow rates enabling the pilot air flows to themselves function as signals indicative of tool non-use and usage conditions.

The invention can of course be applied to uses other than those described above. For example, the invention can be applied to provide control of leaks in entire zones of fluid systems, e.g., a control unit can be situated in a common line upstream of several tool drops or to control leakage in fluid power feed lines. The invention may be integrated in centralized computerized monitoring systems to provide signal inputs indicative of the status of leakage within pressurized fluid systems. For example, if the apparatus indicates high leakage conditions for an undue period of time, a centralized system can detect the same.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. In a pressurized fluid system including at least one fluid conduit means and equipment associated with said conduit means, said system adapted to provide fluid at a line pressure to said fluid conduit means to operate said equipment upon initiation of a usage demand condition, apparatus for automatically controlling fluid leakage from existing points of leakage in said at least one fluid conduit means during non-use of said equipment, comprising:

control unit means coupled into said fluid system including pressure reducing means upstream of said fluid conduit means for reducing the fluid pressure in said conduit means to a low pilot pressure so that during non-use of said equipment a first pilot leak fluid flow at pilot pressure exists in said conduit means through said existing points of leakage therein, said first pilot leak flow having a flow rate which varies continuously, and upon an initial actuation of said equipment a second pilot demand flow at pilot pressure exists in said conduit means, said second pilot demand fluid flow having a flow rate greater than said continuously varying flow rate of said first pilot leak flow, said control unit means further including main valve means for selectively isolating and effecting communication between line pressure and said conduit means in response to a signal;

said control unit means further including sensing means coupled into said conduit means between said pressure reducing means and said equipment for detecting and discriminating between said continuously varying flow rate of said first pilot leak flow and said flow rate of said second pilot demand flow, said sensing means comprising floating means for establishing a floating equilibrium position indicative of said continuously varying flow rate of said first pilot leak flow during non-use of said equipment and a target position indicative of said flow rate of said second pilot demand flow upon initial actuation of said equipment, said sensing means further including means for generating a signal upon sensing said flow rate of said second pilot demand flow and means for transmitting said signal to said main valve means of said control unit means for communicating said conduit means with line pressure.

2. The combination of claim 1 wherein said sensing means comprises means defining a fluid flow passage adapted to be coupled into the fluid flow system downstream of said pressure reducing means, and wherein said floating means include a floatable member situated within said fluid flow passage for obtaining said floating equilibrium position indicative of said continuously varying flow rate of said first pilot leak flow during non-use of said equipment and said target position indicative of said flow rate of said second pilot demand flow upon initial actuation of said equipment.

3. The combination of claim 2 wherein said floatable member comprises a tubular member through which a fluid flow path extends, and wherein said sensing means further includes means for metering the amount of fluid that can flow through said fluid flow path.

4. The combination of claim 3 wherein said tubular member has a first open end and a second end in which a metering opening is formed and wherein said metering means comprises a tapered metering rod fixed within said fluid flow passage extending through said metering opening of said tubular member.

5. The combination of claim 4 wherein said sensing means includes a base fixed within said fluid flow passage, said base having fluid inlet passage means formed therein adapted to communicate with the fluid system and wherein said tapered metering rod extends from said base, said floatable member adapted to rest on said base in the absence of a non-negligible fluid flow through said sensing means with said metering rod substantially closing said metering opening.

6. The combination of claim 2 wherein said signal generating means constitutes means for generating a signal determined by the position of said floatable member within said fluid flow passage.

7. The combination of claim 6 wherein said signal generating means constitutes means for generating a signal upon said floatable member moving to said target position within said fluid flow passage indicative of the flow rate of the second pilot demand fluid flow which in turn is indicative of an equipment usage demand condition.

8. The combination of claim 7 wherein said signal generating means comprise sensing field-generating proximity switch means for generating a signal upon a target member entering the sensing field and a target member mounted to said floatable member by mounting means such that it is situated out of the sensing field when said floatable member is in said floating equilibrium position within said fluid flow passage and such that it is situated within said sensing field when said floatable member moves to said target position within said fluid flow passage.

9. The combination of claim 8 wherein said mounting means comprises target strip means to which said target member is fixed, means for slidably clamping said target strip means to said floatable member and means fixed within said fluid flow passage for limiting the movement stroke of said target strip means, whereby upon said floatable member moving from said floating equilibrium position to said target position within said fluid flow passage, said target strip means moves with said floatable member until said target member is situated within said sensing field whereupon further movement of said target strip is prevented by said movement limiting means.

10. The combination of claim 9 wherein said movement stroke limiting means comprises retaining means fixed within said fluid flow passage having a slot formed therein and wherein said target strip means passes through said slot and includes a notch formed therein cooperating with said slot.

11. The combination of claim 2 further including means for progressively imparting negative bouyancy to said floatable member as the latter moves to said target position, said imparted negative buoyance acting to urge said floatable member towards said floating equilibrium position.

12. The combination of claim 1 wherein said control unit means further include a main fluid flow passage adapted to be coupled into the fluid flow system upstream of said pressure reducing means, said main fluid flow passage adapted to be coupled to said fluid conduit means in which fluid leakage is to be controlled through at least one secondary fluid flow passage and a fluid flow passage extending through said sensing means, said main valve means normally closing said main fluid flow passage from said secondary fluid flow passage to isolate said fluid conduit means from line pressure, and means coupled to said sensing means for opening said main valve means upon receiving said signal generated by said sensing means to communicate said fluid conduit means and line pressure.

13. The combination of claim 12 wherein said control unit further includes an accumulator tank in fluid communication with said main fluid flow passage.

14. The combination of claim 1 wherein said main valve means comprises a poppet valve or the like.

15. The combination of claim 12 wherein said main valve comprises a poppet valve and wherein said poppet valve is situated in a first secondary poppet valve bore one end of which communicates with said main fluid flow passage and the other end of which communicates with a second secondary bore, said second secondary bore communicating with said fluid conduit means.

16. The combination of claim 15 wherein said means for opening said main poppet valve comprises a solenoid valve normally closing said first and second secondary bores with respect to each other, said solenoid valve adapted to open upon receiving said signal from said sensing means, whereby a chamber formed in said poppet valve bore on one side of said poppet valve is vented allowing the poppet valve to open thereby providing communication between said main fluid flow passage upstream of said pressure regulating means and said fluid flow passage of said sensing means to provide line pressure to the fluid conduit means.

17. The combination of claim 1 wherein said apparatus is operatively associated with a compressed air system for driving compressed air driven tools.

18. The combination of claim 1 wherein said apparatus is operatively associated with a hydraulic fluid system for operating hydraulic fluid driven equipment.

19. The combination of claim 1 wherein said apparatus is operatively associated with a fluid system for controlling fluid leakage from a zone of said system including more than one piece of equipment.

20. The combination of claim 1 wherein said control unit means include timer means for maintaining communication between line pressure and the system conduit means in which fluid leakage is to be controlled for a predetermined time after cessation of said usage demand.

21. In a pressurized fluid system including at least one fluid conduit means and equipment associated with said conduit means, said system adapted to provide fluid at line pressure to said conduit means to operate said equipment upon initiation of a usage demand condition, and main valve means for selectively isolating and effecting communication between line pressure and said conduit means in response to a signal, a method for automatically controlling fluid leakage from existing points of leakage in said at least one conduit means during non-use of said equipment, comprising the steps of:
  reducing the fluid pressure in said conduit means to a low pilot pressure so that during non-use of said equipment a first pilot leak fluid flow at pilot pressure exists in said conduit means through said existing points of leakage therein, said first pilot leak flow having a flow rate which varies continuously, and so that upon initial actuation of the equipment a second pilot demand fluid flow at pilot pressure exists in said conduit means having a flow rate greater than said continuously varying flow rate of said first pilot leak flow;
  sensing and discriminating between said continuously varying flow rate of said first pilot leak flow and said flow rate of said second pilot demand flow, said sensing and discriminating step being carried out by providing means for establishing a floating equilibrium position indicative of said continuously varying flow rate of said first pilot leak flow during non-use of said equipment and for establishing a target position indicative of said flow rate of said second pilot demand flow upon initial actuation of said equipment; and
  generating a signal upon sensing said flow rate of said second pilot demand flow, and transmitting said signal to said main valve means for effecting communication of said conduit means with line pressure.

* * * * *